F. C. SCOTT.
HOSE CLAMP.
APPLICATION FILED DEC. 17, 1917.
1,272,541.
Patented July 16, 1918.
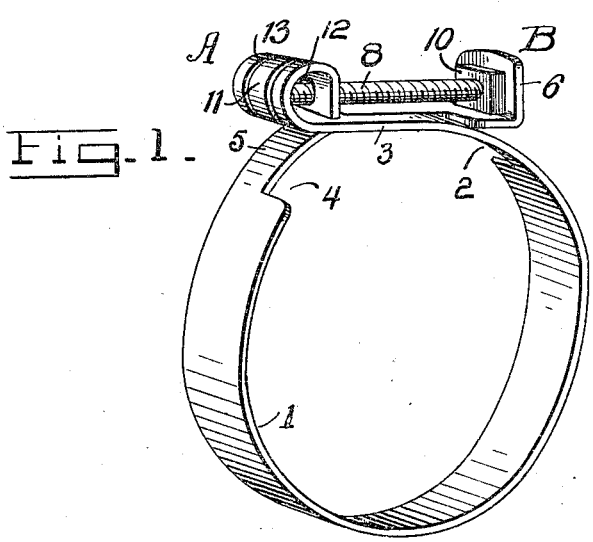
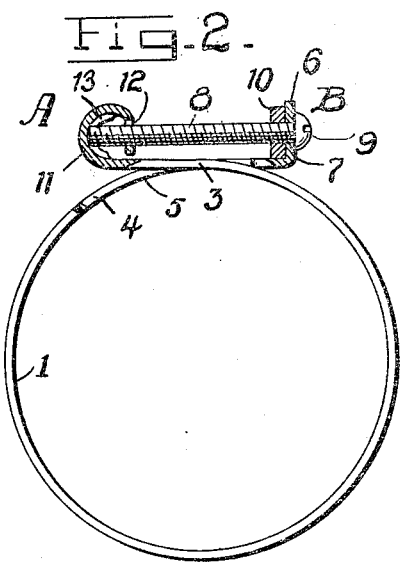
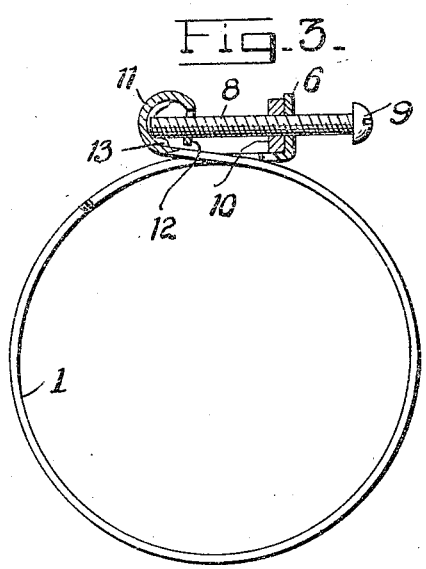
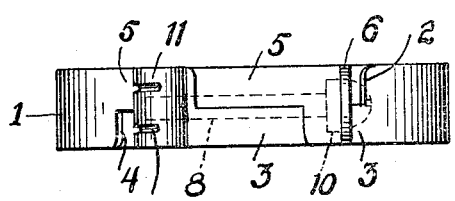
Witnesses
Chas. W. Stauffiger
Anna M. Dorr
INVENTOR
FREDERICK C. SCOTT.
BY
ATTORNEYS

UNITED STATES PATENT OFFICE.

FREDERICK C. SCOTT, OF DETROIT, MICHIGAN.

HOSE-CLAMP.

1,272,541.   Specification of Letters Patent.   Patented July 16, 1918.

Application filed December 17, 1917. Serial No. 207,539.

*To all whom it may concern:*

Be it known that I, FREDERICK C. SCOTT, a subject of the King of England, residing at Detroit, in the county of Wayne and State of Michigan, have invented certain new and useful Improvements in Hose-Clamps, of which the following is a specification, reference being had therein to the accompanying drawings.

This invention relates to hose clamps, and has special reference to that type of clamp comprising a band of tough flexible metal, the ends of which are placed in interengaging relation for supporting a member adapted to spread the ends of the band, and thereby tighten the band about a hose placed on a pipe or other conduit. I am aware of such hose clamps, particularly those upon the market, and a few disclosed by patents, and besides my hose clamp possessing a great many of the advantages previously invented hose clamps, I aim to provide certain improvements by which a hose clamp may be extremely simple in construction, durable, easy to manufacture, and of such construction as to be easily and quickly installed and adjusted so as to establish positive and non-leakable connection between a hose and the pipe or conduit on which it is mounted.

As set forth in the beginning, there is necessarily a band and this band has its ends cut away for overlapping and interengaging relation. One end of the band is provided with an ordinary stove bolt and nut and the opposite end of the band is shaped to afford a socket or keeper for the inner end of the bolt. The bolt by reason of its connection to one end of the band cannot become accidentally displaced and by reason of its inner end freely engaging in the socket or keeper end of the band permits of the end of the band being easily and quickly placed in interengaging relation and separated, all of this being accomplished without destroying the flexibility of the band, without threading one end of the band through the other end, and without sacrificing the strength or any of those prerequisites essential in a good hose clamp.

My invention will be hereinafter considered in detail and reference will now be had to the drawing, wherein—

Figure 1 is a perspective view of a hose clamp in accordance with my invention;

Fig. 2 is a front elevation of the same showing the ends thereof partly in section and widely separated, the hose clamp being closed as far as possible.

Fig. 3 is a similar view showing the ends of the band in interengaging relation, and the hose clamp partially open, and Fig. 4 is a plan of the hose clamp, showing the separating member in dotted lines In the drawing, the reference numeral 1 denotes a band made of a tough flexible metal as brass, and said band for the greater part of its length is uniform in width with uninterrupted smooth inner and outer walls, so that said band, when clamped about a hose will not injure the hose or present any exterior protuberance or obstruction.

The ends of the band are generally designated by the characters A and B and contiguous to the end A of the band, one side edge of the band is provided with a recess 2 leaving a neck portion 3. The end B of the band has the opposite edge thereof provided with a recess 4 leaving a neck portion 5, and it is by virtue of the recesses 2 and 4 and the neck portions 3 and 5 that the ends A and B of the band may be placed in interengaging and overlapping relation. It is possible to spring the ends of the bands sidewise so that the neck portion 3 of the band end A will engage in the recess 4 of the band end B with edges of the neck portions 3 and 5 contacting and the end A overlying the neck portion 5 and the end B overlying the neck portion 3. The recesses 2 and 4 are of sufficient length to permit of the band being contracted and distended with the ends A and B confronting each other, and in placing the ends of the band in such relation it is not necessary to thread one end of the band through the other end, consequently the band may be easily and quickly placed about or on the end of a section of hose.

The band end B has its extremity bent to provide an outstanding lug 6 which is provided with an aperture or opening 7, adapted to receive an ordinary stove bolt 8 or a similar adjustable member. The stove bolt 8 has a head 9 and said stove bolt is loose in the opening 7 of the lug, but may be fixed relatively to the lug by a nut 10 spot welded or otherwise secured against the inner face of the lug. It is therefore possible to adjust the stove bolt and hold the same in a desired position relatively to the band end B of the clamp and one of these adjusted positions is shown in Fig. 3, and such position is maintained by the nut 10, the ends A and B of the band and the expansive force of the same.

The band end A has its extremity bent to form a looped portion 11 that serves as a socket member. The looped or rolled extremity is apertured, as at 12, and carried into proximity to the neck portion 3, so that the end of the stove bolt 8 may extend through the aperture 12 and extend in the socket member and against the wall thereof, as shown in Fig. 2. It is therefore evident that with the ends of the band in overlapped interengaging relation and the stove bolt engaging the ends of the band, that said stove bolt serves as a member for separating the ends of the band the distance between the nut 10 and that end of the bolt within the socket member. The looped or rolled extremity of the band end A is provided with pressed in ribs 13 which adds rigidity to the end of the band, reinforces the same against pressure of the bolt 8, and coöperates with the aperture 12 in preventing lateral displacement of the end of the stove bolt.

Considering the hose clamp as shown in Fig. 2, it is possible to press inwardly upon the sides of the band and thereby further separate the ends A and B. In performing this operation, the end A is shifted away from the end of the stove bolt 8 and after the stove bolt is out of the aperture 12, it is possible to shift the end A sidewise relatively to the end B and completely open the hose clamp. When the hose clamp is in an open position, the hose clamp may be placed about a hose, the ends A and B placed in overlapped interengaging relation, with the stove bolt extending into the socket member at which time the stove bolt may be adjusted to further separate the ends of the band and thereby cause the band and its neck portions to snugly embrace the periphery of a hose.

When the diameter of a hose is known, it is possible to set the stove bolt 8 so as to engage in the socket member of the end A, with the hose clamp almost clamped upon the hose; then by right adjustment of the stove bolt the clamp may be made permanent on the hose.

Another feature of my invention is that of having the stove bolt 8 always in engagement with the end B in the band, consequently the stove bolt cannot become accidentally displaced, particularly when the band is opened. Furthermore the stove bolt can be readily adjusted to facilitate placing the band on the hose when the ends of the band are free.

It is thought that the advantages of my improvement will be apparent without further description and while in the drawing there is illustrated a preferred embodiment of my invention it is to be understood that the structural elements are susceptible to such variations and modifications as fall within the scope of the appended claim.

What I claim is:—

A hose clamp comprising a band having inter-engaging ends with one end of said band bent to form a socket member having one wall apertured and the other ribbed, the opposite end of said band having an apertured lug, a nut connected to the face of the lug of said band and a stove bolt adjustable in said nut adapted to extend through the apertured wall of the socket member of said band and engage between the ribs of said band.

In testimony whereof I affix my signature in the presence of two witnesses.

FREDERICK C. SCOTT.

Witnesses:
 LEWIS E. FLANDERS,
 KARL H. BUTLER.